United States Patent [19]
Dosch et al.

[11] 3,857,098
[45] Dec. 24, 1974

[54] PROCESS FOR MEASURING THE REVOLUTION SPEED OF A FALSE TWIST TUBE

[75] Inventors: Peter Dosch, Jona; Dieter Dorsch, Ebnat-Kappel, both of Switzerland

[73] Assignee: Heberlein & Co., AG, Wattwil, Canton of St. Gall, Switzerland

[22] Filed: June 20, 1973

[21] Appl. No.: 371,593

[30] Foreign Application Priority Data
June 26, 1972  Switzerland.......................... 9566/72

[52] U.S. Cl..................... 324/174, 57/77.45, 57/93
[51] Int. Cl. .............................................. G01p 3/48
[58] Field of Search ............ 324/173, 174; 57/77.3, 57/77.45, 93; 310/155, 168

[56] References Cited

UNITED STATES PATENTS

| | | |
|---|---|---|
| 3,252,024 | 5/1966 | Loudon.............................. 324/174 |
| 3,665,306 | 5/1972 | Orth.................................. 324/174 |

*Primary Examiner*—Michael J. Lynch
*Attorney, Agent, or Firm*—Fitzpatrick, Cella, Harper & Scinto

[57] ABSTRACT

Probe for measuring revolution speed of a body, such as the twist tube of a textile texturing machine, comprises a magnetically conductive sensor and induction coil wound around the sensor. The sensor is directed toward a point lying beside the body and particularly beside a particular configuration of same thus to suppress stray fields and field variations.

3 Claims, 6 Drawing Figures

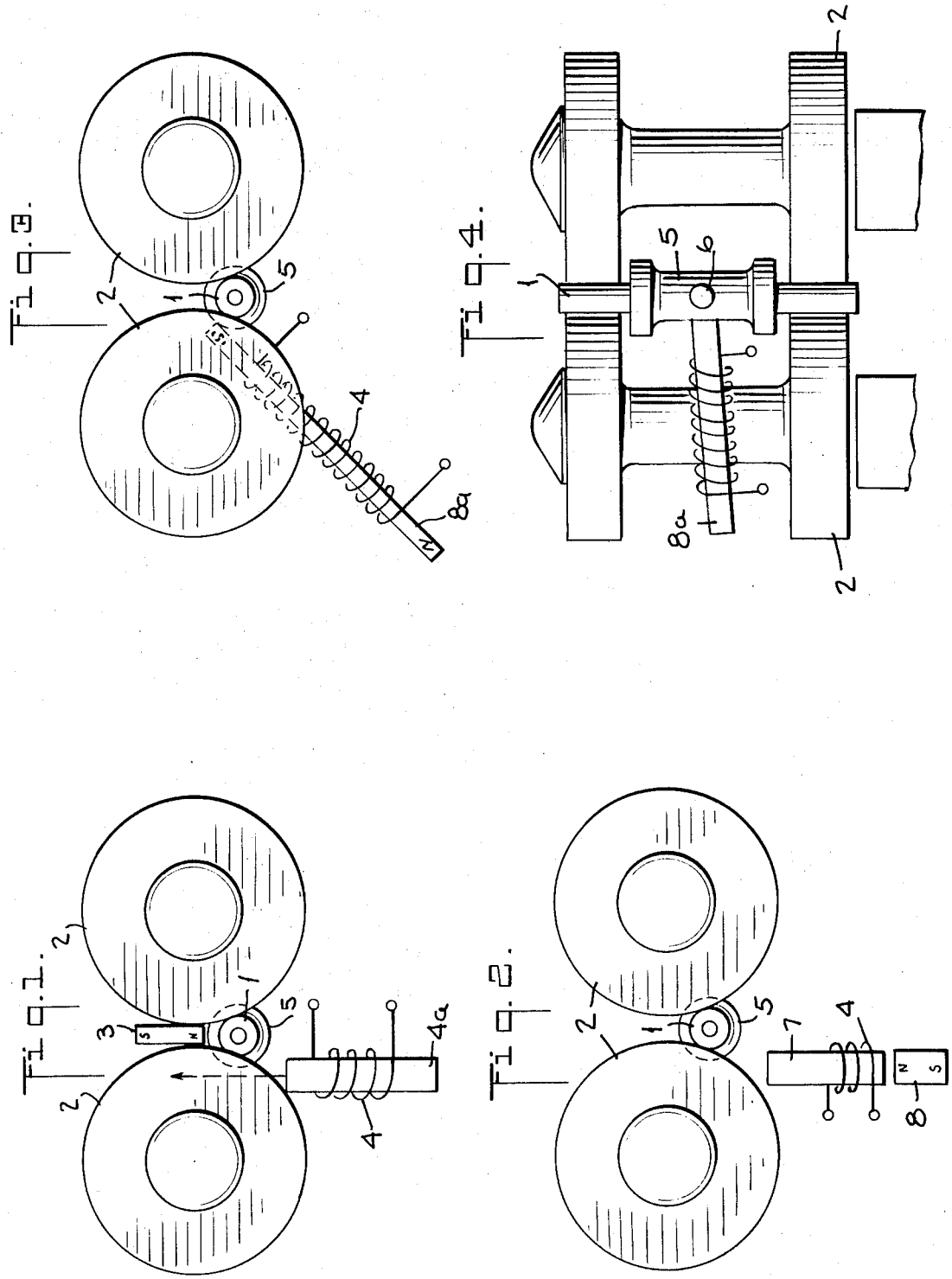

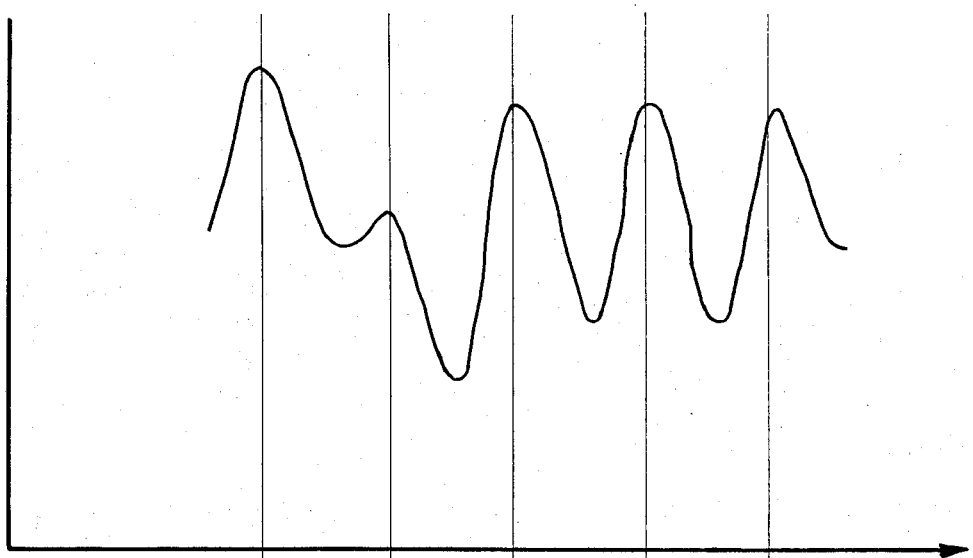
Fig. 5.
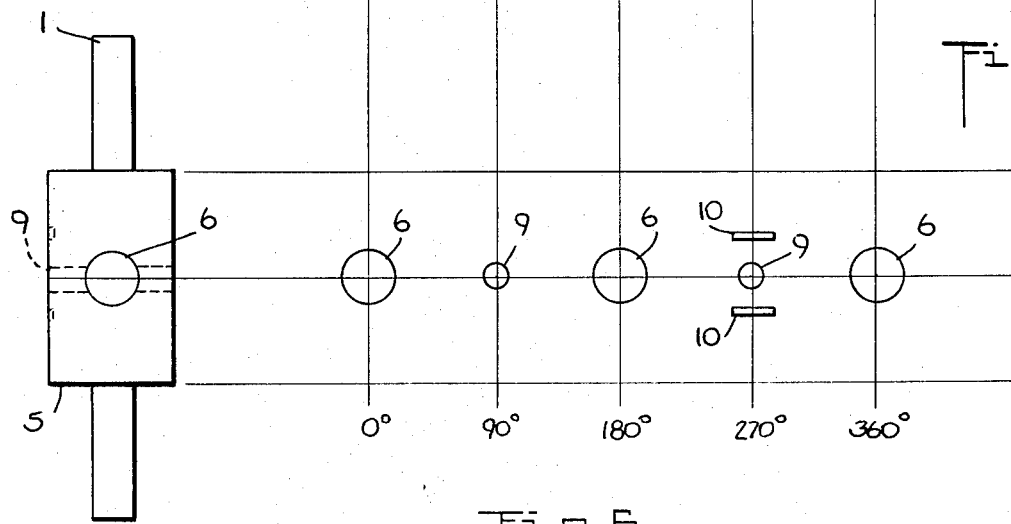
Fig. 6.
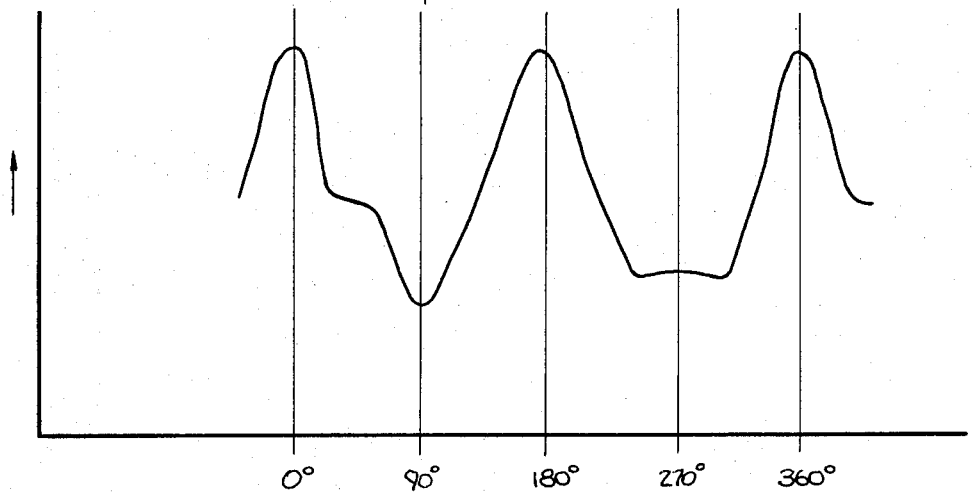

PROCESS FOR MEASURING THE REVOLUTION SPEED OF A FALSE TWIST TUBE

The present invention relates to a method and apparatus for measuring the revolution speed of revolving bodies, and especially of twist tubes of false-twist devices utilized for texturing textile yarns, by means of an inductive measuring probe.

As is well known by those persons skilled in the art, twist tubes of false-twist machines are usually driven at revolution speeds of far above 100,000 revolutions per minute and may have at one end or in the central zone of the tube, a twisting head with a pin such as a sapphire pin extending transversely with respect to the axis of the tube around which the yarn to be textured is wrapped. The twist tube may furthermore have a transverse bore for use in threading the yarn through the tube and around the pin. The twist tube is frequently maintained on drive rollers by means of permanent magnets and the revolution speed of such tubes has been measured with known devices by utilizing the transmission of the falsified field of the magnetic holder due to asymmetric shape of the twist tube. Generally speaking however, in attempting to measure the extremely high revolution speed of such rotating bodies, it has proven very difficult to obtain precisely definable and measurable signals. This results particularly because of the fact that while balancing the twist tube, material is removed from the same at various locations, for example by milling, and this produces additional field variations.

We have conceived a method and apparatus by which we are able to avoid the disadvantages of the known devices; and particularly, we provide a process and a measuring probe for registering field variations produced by rotating twist tubes substantially without disturbance by stray fields.

According to the present invention, this problem is primarily resolved by directing the measuring probe for effecting the measure towards a point lying beside the twist tube approximately on the level of a bore, particularly of a threading hole. Contrary to the opinion existing up to now, namely, that the sensors of measuring probes must be directed exactly towards the twist tube in order to receive the strongest signals, the present invention teaches directing of the probe towards a point lying beside the twist tube. The reduction of the sensor signal caused thereby can be easily compensated for by increasing the degree of amplification of subsequent measuring amplifiers. By directing the probe according to the present invention, influences of stray fields and field variations by other asymmetries of the twist tube, for example balanced portions, are suppressed in a most simple way.

The process of the present invention can be effected in a particularly simple manner with a measuring probe, the induction coil of which is wound onto a magnetically conductive, oblong, preferably bar-shaped sensor. The stationary or temporary arrangement of such a sensor on false-twist devices is possible without difficulties. It is particularly advantageous, considering the problem resolved by the present invention, if the measuring probe has a probe magnet for suppressing stray fields and for induction of a defined magnetic field in the twist tube. Using such active probes, the revolution speeds of twist tubes can be measured independently of the type of holder. A particularly simple construction and reliable signal reception is obtained if the probe magnet is in the form of a bar-shaped sensor and is at least partially surrounded by the annular induction coil. In this way, reduction of the stray fields by the new measuring process and also additional suppression of disturbing influences is assured by the probe magnet.

The measuring probe of the present invention can be used in a particularly simple manner if the sensor protrudes from the wound induction coil at least on one side and thereby can also be inserted into small interstices between twist tubes and any associated holding device.

The use of the measuring probe according to the present invention can be made particularly advantageous if one end of the bar-shaped sensor is arranged laterally beside the twist tube and extends transversely with respect to the same. It is thereby assured in a simple way that stray signals and disturbances are not received by the sensor directed to a point beside the twist tubes, but that on the other hand, measuring signals are reliably received owing to the arrangement immediately beside the twist tube. It has proved advantageous if the end of the probe magnet facing the twist tube protrudes approximately to its center; in top view, and since the twist tubes extend vertically, this means that the end of the probe magnet is approximately in line with the twist tube diameter which extends perpendicular with respect to the probe magnet.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification wherein:

FIG. 1 is a plan view of a twist tube in operating position and showing a measuring probe in use;

FIG. 2 is similar to FIG. 1 but shows a modified example of a measuring probe according to the present invention;

FIGS. 3 and 4 show a measuring probe utilizing bar-shaped magnet with the features of the present invention; and FIGS. 5 and 6 show graphical curves of the probe signal.

According to FIGS. 1 and 4, the twist tube 1 is supported in the cuneate throat between drive wheels 2 against which it is attracted by magnet 3, and is driven by the positive rotation of one of the wheels 2. For measuring the revolution speed of the twist tube 1, there is provided an induction coil 4 wound onto an insulating bar 4a, and in which a rotating field is induced by rotation of the transversal bore 6 in the twisting head 5 (FIG. 4) provided as a threading hole. By the orientation of the induction coil 4, as shown, towards a point lying beside the twist tube, the field lines issuing from the twist head 5 intersect the induction coil 4 obliquely so that stray signals are suppressed and only signals formed by the transversal bore 6 are received with the amplitude necessary for evaluation.

According to FIG. 2, the induction coil 4 is wound onto a ferrite bar 7 which itself is arranged immediately beside the twist tube 1. As in the example according to FIG. 1, what may be termed a falsified orientation of the ferrite bar 7 has been effected intentionally to suppress stray fields which may be due, for example, to irregular shape of the twist head 5. For further compensation of stray fields and for induction of a defined field in the twist tube 1, there is also provided a probe magnet 8 positioned at the end of the bar 7 remote from the twist tube.

FIGS. 3 and 4 show a measuring probe in which the induction coil 4 is wound directly onto a bar-shaped probe magnet 8a. The probe magnet 8a is then arranged laterally beside the twist tube so that its front edge is approximately in line with the twist tube diameter extending perpendicular thereto. The lateral arrangement then assures on one hand immediate effect of the probe magnet 8a onto stray fields and the compensation of disturbing influences before they can have an effect on the induction coil 4; on the other hand, by mounting the probe beside or beneath the twist tube from behind, accessability of the twist tube is also assured if the probe is built-in irremovably. Furthermore, the irremovable arrangement of probes is also made possible in a simple way even when using twist tubes of various diameters.

FIG. 5 shows the signals yielded by a rotating twisting head 5 in association with its angular position as determined by conventional means. In this case, 0° represents the moment the bore 6 passes the probe sensor. As can be seen, the relatively big bore 6 at this moment induces a relatively big field variation. After 90°, the sapphire bore 9 passes the sensor, thus inducing a further maximum of induction. Between 90 and 180°, the curve reaches a minimum, and upon reaching 180° and passage of the other side of the bore 6 near the sensor, the curve reaches again a maximum. At 270°, the induction, due to balanced locations 10, and the sapphire bore 6 incidentally coinciding with the same, the induction reaches a maximum value which is identical with the deviation at 0°, or 180°, respectively. As can be seen, no measuring impulses can be derived from thus falsified signals to obtain reproducable revolution speed measurements, as the measuring pulses are different in each twist tube depending on the balance locations of contours, parts, etc.

FIG. 6, however, shows the curve of the sensor output voltage obtainable according to the process of the present invention and using our new measuring probe. In this case, the stray fields are suppressed so that reliable measurement of the revolution speed is assured by appropriate evaluation, for example by means of a digital counter.

We believe that the method and apparatus of our novel concept will now be understood, and that the advantages thereof will be fully appreciated by those persons skilled in the art.

We claim:

1. Process for electromagnetic measurement of the speed of revolution of a twist tube of a false twisting device wherein said twist tube is fabricated from magnetically susceptible material and has a bore extending transversely of the longitudinal axis thereof, said process comprising the steps of positioning the twist tube in contact with the peripheries of a pair of discs and in a magnetic field to maintain said twist tube pressed against the peripheries of said discs, one of which discs is driven, and positioning an induction measuring probe in the vicinity of said twist tube on the level of said bore and with its longitudinal axis directed towards a point lying beside said twist tube along a radial line through said twist tube and at an angle with respect to the longitudinal axis of said probe, whereby field lines issuing from said twist tube intersect said induction coil obliquely.

2. Process for measuring the revolution speed of the twist tube of a false-twist apparatus by means of an inductive measuring probe according to claim 1, characterized by positioning the probe so that one end of it lies laterally beside the twist tube and extends transversely with respect to the same.

3. Process according to claim 2, characterized by positioning one end of the sensor in approximate alignment with the diameter of the twist tube extending perpendicular with the probe magnet.

* * * * *